(12) United States Patent
Takumah

(10) Patent No.: US 12,043,743 B2
(45) Date of Patent: Jul. 23, 2024

(54) LIGNIN-CELLULOSE LAYER, COALESCE AMALGAMATOR AND SUPPLEMENTATION DISPERSER

(71) Applicant: Maluki Chakita Takumah, Atlanta, GA (US)

(72) Inventor: Maluki Chakita Takumah, Atlanta, GA (US)

( * ) Notice: Subject to any disclaimer, the term of this patent is extended or adjusted under 35 U.S.C. 154(b) by 245 days.

(21) Appl. No.: 17/696,957

(22) Filed: Mar. 17, 2022

(65) Prior Publication Data

US 2023/0295435 A1    Sep. 21, 2023

(51) Int. Cl.
| | | |
|---|---|---|
| C08L 97/02 | (2006.01) | |
| B23K 20/10 | (2006.01) | |
| B23K 20/22 | (2006.01) | |
| B23K 103/00 | (2006.01) | |

(52) U.S. Cl.
CPC ............. *C08L 97/02* (2013.01); *B23K 20/10* (2013.01); *B23K 20/22* (2013.01); *B23K 2103/42* (2018.08)

(58) Field of Classification Search
CPC ............................ B65D 85/804; B65D 25/808
See application file for complete search history.

(56) References Cited

U.S. PATENT DOCUMENTS

| | | | |
|---|---|---|---|
| 11,043,198 B1* | 6/2021 | Stone .................. | G10K 11/172 |
| 2003/0175456 A1* | 9/2003 | Whittaker ............ | B65D 85/808 |
| | | | 428/36.1 |
| 2007/0042083 A1* | 2/2007 | Larkin .................. | A47G 19/16 |
| | | | 426/77 |
| 2023/0074931 A1* | 3/2023 | Harste ..................... | D04H 1/65 |

* cited by examiner

*Primary Examiner* — Liam J Heincer
(74) *Attorney, Agent, or Firm* — Silver Legal LLC; Jarrett L. Silver

(57) ABSTRACT

An unconventional beverage accessory that can be submerged in cold or hot drinks. The Lignin-Cellulose layer, Coalesce Amalgamator and Supplementation Disperser are beverage accessories designed to tackle global waste, boredom, settle supplements. The new invention helps add structure, advancement in modern society. The new invention is a small Lignin Coalesce Supplementation Disperser designed for a person with health conscious, environmental conscious and advanced new beverage concepts.

This new invention is designed to help prevent messy spotty clutter on tables etc. This present invention is also designed to take control with stiff firmness on its thin organic form. The new invention's one time usage is designed to make rich compost.

The three major commodities coffee, tea, powder supplements are then sealed inside between layers of lignin formed in coalesce veneer sheets and non-woven corn fabric sheets.

18 Claims, 5 Drawing Sheets

LIGNIN-CELLULOSE LAYER, COALESCE AMALGAMATOR AND SUPPLEMENTATION DISPERSER

BACKGROUND OF THE INVENTION

In this modern-day society, what we drink keeps evolving with problem solving techniques to manipulate the standard forms. The new inventions challenge social understanding with advancements in the beverage sector. The social practice in collaborative discussion and functionality debates will continue on social design.

This new invention carries a new unique structure behavior with two world traded major commodities coffee and tea in conservative traditional standards within the beverage societies.

The present new invention hurdles in great potential waste solutions and reused in compost.

In many instances standard tea bags, tiny portable coffee bags are hard to manage on its loose uncontrollable string, hot soaked bags can injure fingertips. The present new invention is highly stiff and maneuverable by movements of the wrists, hands.

The present new invention is more manageable with its stiff Coalesce supplement disperser and parallels with the common spoon, stir.

DESCRIPTION

Figure 1A:
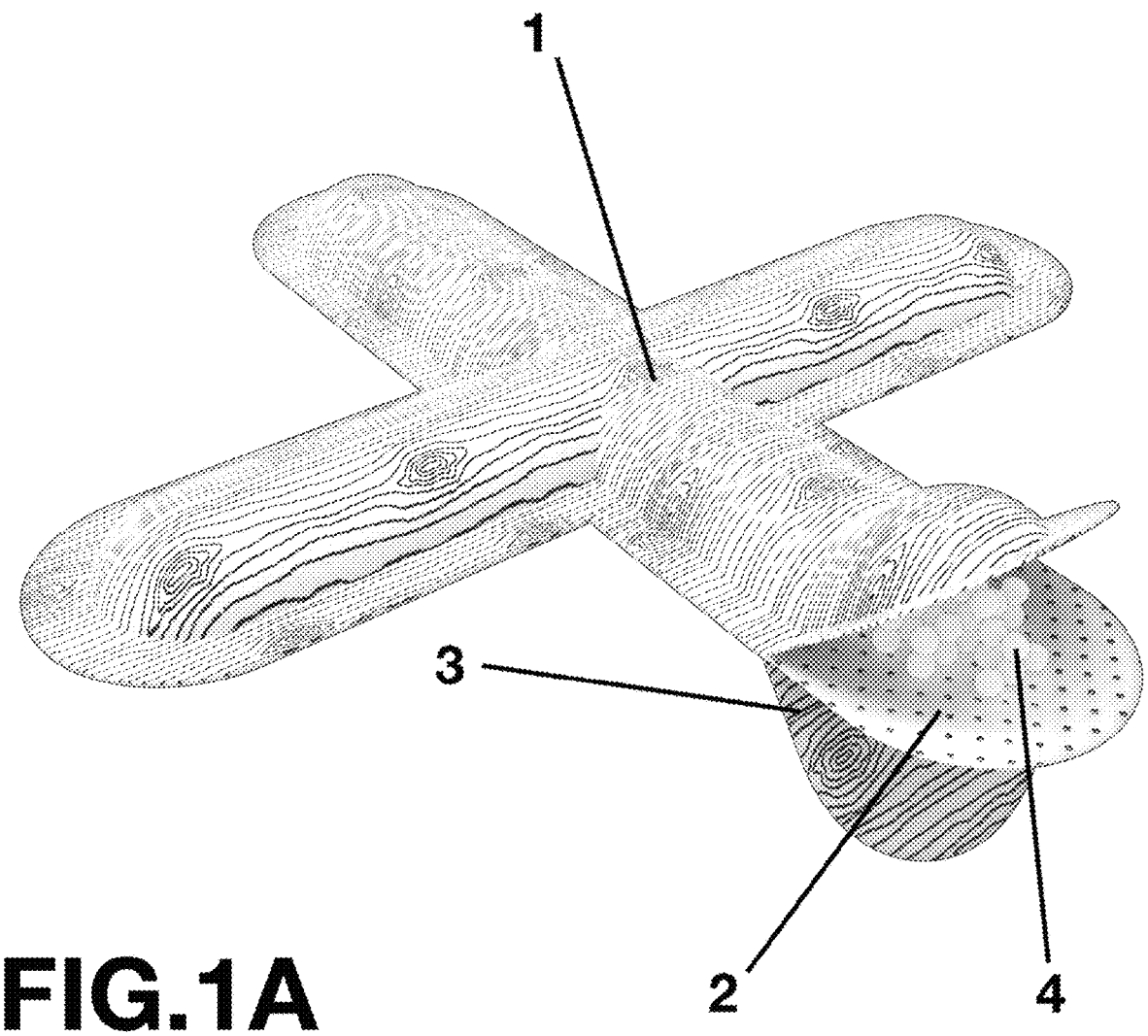
FIG. 1A. enlarged view of the Lignin-Cellulose layer Disperser's plus shape form. The plus shape form area is exposed which illustrate the opened layers and disperse source. The Lignin-Cellulose layer Disperser upper left angle perspective indicating, (lingnin veneer sheet), (supplement disperse source), (non-woven web material), (lingnin veneer sheet).

This application is a NON-Provisional Patent Application, filed Mar. 17, 2022.

SUMMARY OF THE INVENTION

Briefly described, the present invention provides Lignin-Cellulose layer, Coalesce Amalgamator and Supplementation Disperser This invention is designed as a firm hand controlled organic supplementation disperser when submerged in liquid.

Accordingly, an object of this invention is to provide flavor to your drinks in an unconventional or distinctive way in the container cup.

Another object of this invention is to provide inspiring gripping for a less messy cleaning surface.

There and other objects, features and advantages of this invention will become apparent from the following detailed description.

TECHNICAL FIELD

The main important feature of the invention is the Lignin compound elements, and how Coalesce forms by friction techniques on sonic welding. Lignin-cellulose composite exhibited higher tensile strength, water stability, and thermal stability than conventional cellulose paper. The present invention related purposes to release flavors supplement extract from fibers through lignin sheets. This present invention is manual maneuvering by hand. In this application, the following terms will be understood to have the indicated definitions:

Organic polymer—this present invention is unconventional and needs a new social practice for lignin, coalesce form all around the present invention.

Macromolecule elements—this present invention is also designed to prevent over waste plastics going into marine ocean animals and landfills. The new invention's waste is its replaceable disposable designed for compost.

Amalgamated structure to manipulate force—this new invention is made with sonic welding with a feature called stiffness, of fiber are measures of the resistance offered by an elastic fiber to deformation.

Organic polymers compounds are formed in a thin veneer sheet designed to bond with its macromolecule's monomer fibers. Both synthetic and natural polymers can be manipulated through sonic stress welding precision process bonding via chemical components that are activated during welding. The sonic welding temperature discrepancy between the experimentally measured values and the predicted values. These merging reactions involved in the process tensile shear strength between thin veneer wood sheets performed a discrepancy time of 1.5 s.

DETAILED DESCRIPTION OF THE INVENTION

The present invention is described as Lignin-Cellulose layer, Coalesce Amalgamator and Supplementation Disperser. The main important feature of the invention is the Lignin compound elements and Coalesce forms, which is designed in any shape. This present invention enclosing a body capsule designed to compact two major world trading commodities (tea, Coffee). This present invention operates by movements of the wrists, hands function in a drinking container cup with cold, hot liquid.

This present new invention has several key factors designed into the Lignin-Cellulose layer, Coalesce Amalgamator and Supplementation Disperser.

The present invention's thin veneer sheet elements feature is organic polymers compounds. These veneer sheets are macromolecules composed of many repeating monomer units. Both synthetic and natural polymers play a crucial role in everyday life. Polysaccharides, polypeptides, and polynucleotides are the main types of biopolymers in living cells FIG. 1A shows an embodiment of this invention. shows lignin surface thin wood veneer on a formed plus shape 1 illustrates nonwoven web fabrics porous sheet of corn base fiber structure on a formed plus shape 2 indicates bottom visual of the lignin surface thin wood veneer formed on a formed plus shape 3 indicates any source of flavored nutritional powder supplements and tea, coffee 4.

Figure 2B:
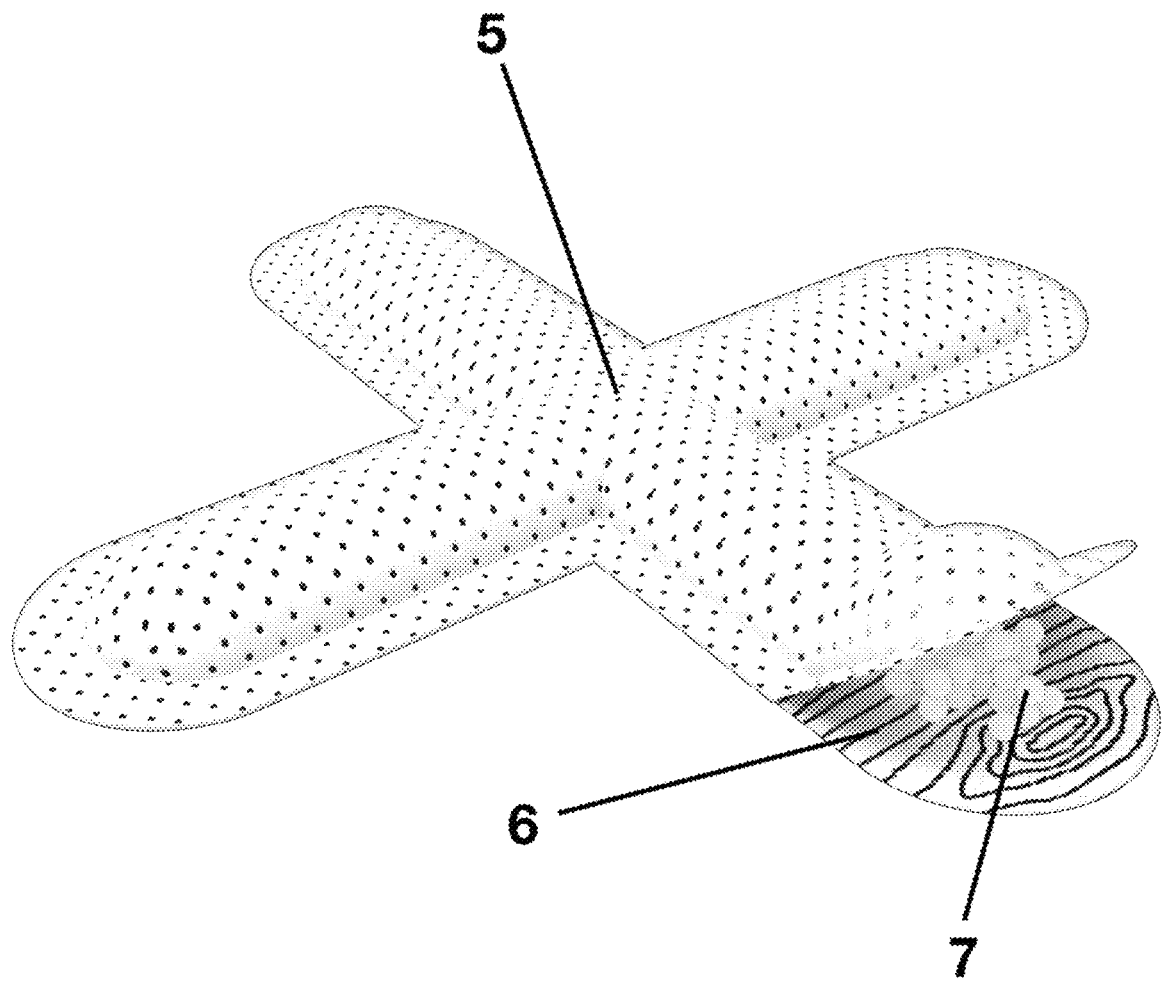
FIG. 2B. enlarged view of the Lignin-Cellulose layer Disperser's plus shape form. The plus shape form area is exposed which illustrates the opened layers and dispersed source. The Lignin-Cellulose layer Disperser upper left angle perspective indicating, (non-woven web material), (supplement disperse source), (lingnin veneer sheet).

FIG. 2B shows an embodiment of this invention. An enlarged view that illustrates nonwoven web fabrics porous sheet of corn base fiber structure on a formed plus shape 5 shows bottom visual of the lignin surface thin wood veneer on a formed plus shape 6. shows indicates any source of flavored nutritional powder supplements and tea, coffee 7.

Figure 3C:
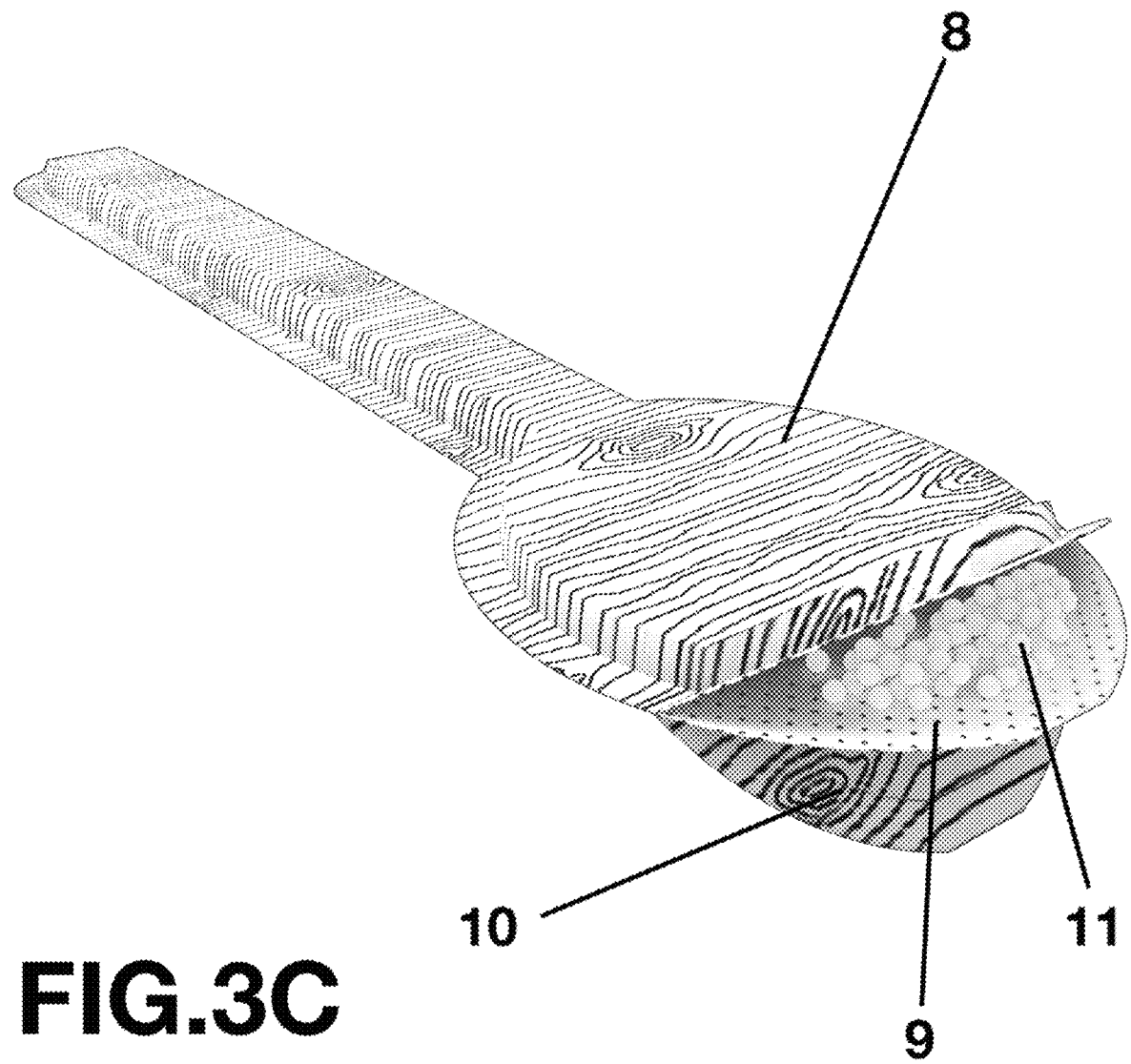
FIG. 3C. enlarged view of the Lignin-Cellulose layer Disperser's spoon shape form. The spoon shape form area is exposed which illustrate the opened layers and disperse source. The Lignin-Cellulose layer Disperser upper left angle perspective indicating, (lingnin veneer sheet), (supplement disperse source), (non-woven web material), (lingnin veneer sheet).

FIG. 3C shows an embodiment of this invention. shows lignin surface thin wood veneer on a formed spoon shape 8 illustrates nonwoven web fabrics porous sheet of corn base fiber structure on a formed spoon shape 9 indicates bottom visual of the lignin surface thin wood veneer formed on a formed spoon shape 10 indicates any source of flavored nutritional powder supplements and tea, coffee 11.

Figure 4D:
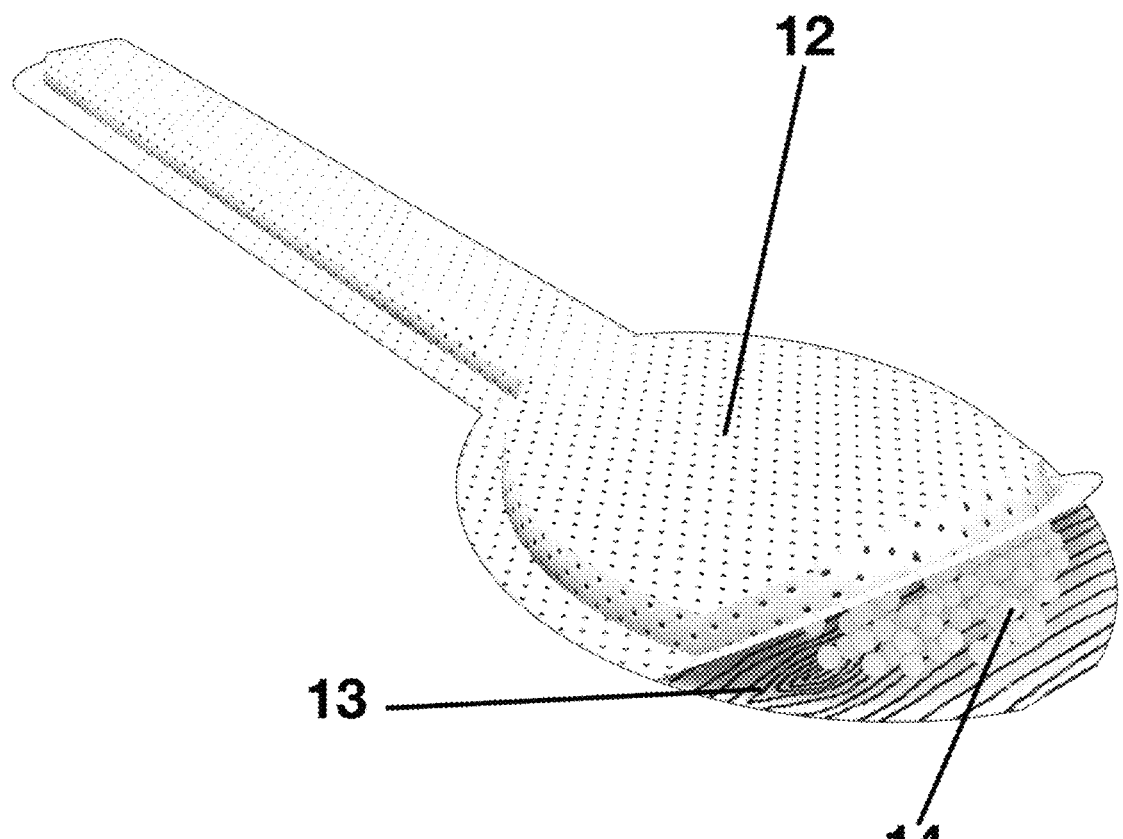
FIG. 4D. enlarged view of the Lignin-Cellulose layer Disperser's spoon shape form. The spoon shape form area is exposed which illustrate the opened layers and disperse source. The Lignin-Cellulose layer Disperser upper left angle perspective indicating, (non-woven web material), (supplement disperse source), (lingnin veneer sheet).

FIG. 4D shows an embodiment of this invention. An enlarged view that illustrates nonwoven web fabrics porous sheet of corn base fiber structure on a formed spoon shape 12 shows bottom visual of the lignin surface thin wood veneer on a formed spoon shape 13. shows indicates any source of flavored nutritional powder supplements and tea, coffee 14.

Figure 5E:
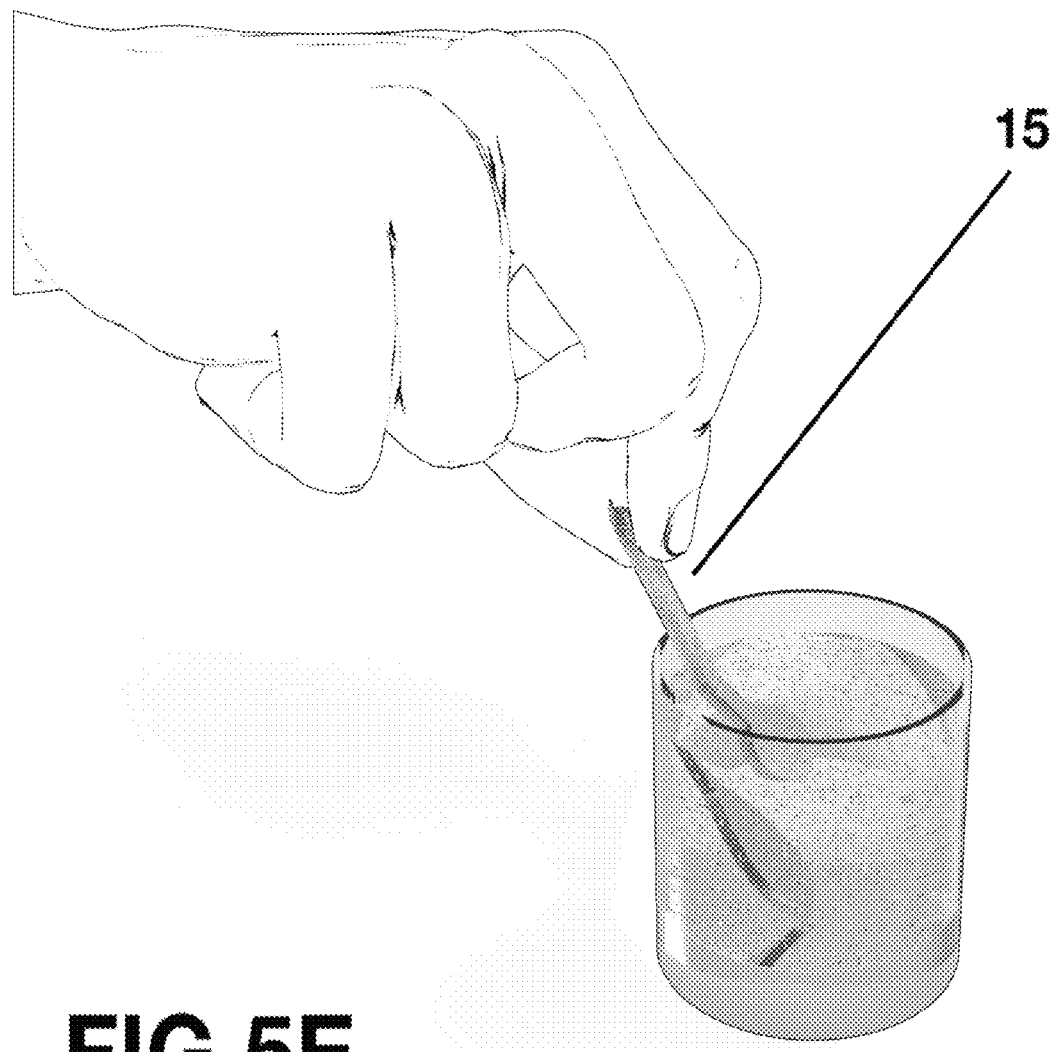
FIG. 5E. enlarged view of the Lignin-Cellulose layer Disperser's spoon shape form display in container cup act of functionality in view.

FIG. 5E shows an embodiment of this invention. An enlarged view that illustrates the Lignin-Cellulose layer, Coalesce Amalgamator and Supplementation Disperser on a formed spoon shape. And shown in its suited purpose of functionality in the drinking container cup 15.

The invention claimed is:

1. A disperser, comprising:
    at least one lignin containing cellulose layer;
    a nonwoven web sheet layer; and
    a cavity for a supplement disperse source,
    wherein the disperser is a stiff article prepared by sonic welding of the layers and capable of manual maneuvering by hand to release the supplement disperse source when submerged in liquid.

2. The disperser of claim 1 wherein the disperser is plus shaped.

3. The disperser of claim 1 wherein the disperser is spoon shaped.

4. The disperser of claim 1 wherein the disperser is paddle shaped.

5. The disperser of claim 1 wherein the disperser is boat paddle shaped or tennis racket shaped.

6. The disperser of claim 1 wherein the at least one lignin containing cellulose layer and nonwoven web sheet layer comprise organic materials.

7. The disperser of claim 1 wherein the nonwoven web sheet layer is corn-derived.

8. The disperser of claim 7, wherein the non-woven sheet layer is porous.

9. The disperser of claim 7, wherein the non-woven sheet layer is a corn based fiber structure.

10. The disperser of claim 1 wherein the disperser contains a supplement disperse source of tea in the cavity.

11. The disperser of claim 1 wherein the disperser contains a supplement disperse source of coffee in the cavity.

12. The disperser of claim 1 wherein the disperser contains a supplement disperse source of flavored nutritional powder supplements in the cavity.

13. The disperser of claim 1 wherein the disperser is soaked in at least one sweetened flavor oil extract.

14. The disperser of claim 1, further comprising the supplement disperse source, wherein the supplement disperse source is selected from the group consisting of tea, coffee, flavored powder, or herbal fiber supplement.

15. The disperser of claim 1, wherein the at least one lignin containing cellulose layer is a wood veneer.

16. A disperser, comprising:
    at least one lignin containing wood veneer layer;
    a porous nonwoven web sheet layer; and
    a cavity for a supplement disperse source,
    wherein the disperser is a stiff article prepared by sonic welding of the layers and capable of manual maneuvering by hand to release the supplement disperse source when submerged in liquid.

17. The disperser of claim 16, wherein the non-woven sheet layer is a corn based fiber structure.

18. The disperser of claim 16, further comprising the supplement disperse source, wherein the supplement disperse source is selected from the group consisting of tea, coffee, flavored powder, or herbal fiber supplement.

* * * * *